US011716477B2

(12) United States Patent
Fukasawa

(10) Patent No.: US 11,716,477 B2
(45) Date of Patent: Aug. 1, 2023

(54) DISPLAY DEVICE

(71) Applicant: Samsung Display Co., LTD., Yongin-si (KR)

(72) Inventor: Takayuki Fukasawa, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/685,408

(22) Filed: Mar. 3, 2022

(65) Prior Publication Data

US 2023/0011698 A1 Jan. 12, 2023

(30) Foreign Application Priority Data

Jul. 9, 2021 (KR) .......................... 10-2021-0090586

(51) Int. Cl.
*H04N 19/61* (2014.01)
*H04N 19/176* (2014.01)
*H04N 19/182* (2014.01)

(52) U.S. Cl.
CPC ......... *H04N 19/176* (2014.11); *H04N 19/182* (2014.11); *H04N 19/61* (2014.11)

(58) Field of Classification Search
CPC ..... H04N 19/176; H04N 19/182; H04N 19/61
USPC .................................................. 375/240.02
See application file for complete search history.

(56) References Cited

U.S. PATENT DOCUMENTS

| 9,153,171 | B2 | 10/2015 | Sakariya et al. |
| 10,431,719 | B2 | 10/2019 | Cok et al. |
| 10,446,719 | B2 | 10/2019 | Bower et al. |
| 10,615,152 | B2 | 4/2020 | Huska et al. |
| 10,951,875 | B2 | 3/2021 | Wetzstein et al. |
| 10,984,703 | B2 | 4/2021 | Iwaki et al. |
| 2021/0201791 | A1 | 7/2021 | Fukasawa |

FOREIGN PATENT DOCUMENTS

| KR | 10-2049955 | 11/2019 |
| KR | 10-2019-0133695 | 12/2019 |
| KR | 10-2165409 | 10/2020 |
| KR | 10-2021-0028240 | 3/2021 |
| KR | 10-2021-0083471 | 7/2021 |

*Primary Examiner* — Nguyen T Truong
(74) *Attorney, Agent, or Firm* — H.C. Park & Associates, PLC

(57) ABSTRACT

A display device includes a first display layer including display elements disposed on an object; a power supply that supplies a power signal to the display elements; and a signal controller having an encoder that encodes first image data into second image data and that supplies it to the display elements. Each display element includes a base member; a pixel a driving circuit unit having a decoder that decodes the second image data into the first image data and that provides a pixel driving signal to the pixel; a first antenna unit that receives the power signal and that provides the power signal to the driving circuit unit; a second antenna unit that receives the second image data and that provides the second image data to the decoder; and a third antenna unit that transmits and receives an addressing signal for detecting a relative position between the display elements.

20 Claims, 11 Drawing Sheets

FIG. 1A
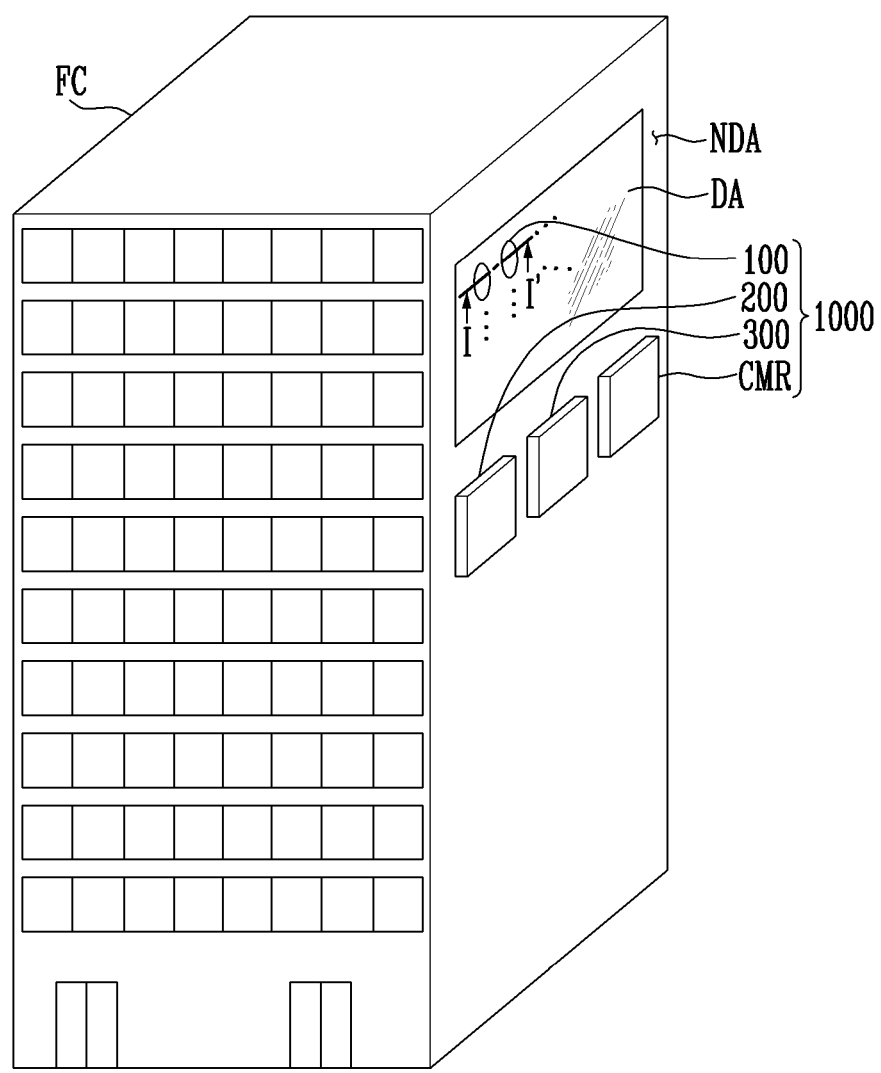
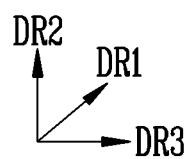

DISPLAY DEVICE

CROSS-REFERENCE TO RELATED APPLICATION

The application claims priority from and the benefit of Korean Patent Application No. 10-2021-0090586, filed Jul. 9, 2021, which is hereby incorporated by reference for all purposes as if fully set forth herein.

BACKGROUND

Field

Embodiments of the invention relate to a display device.

Discussion of Background

With the development of multimedia, the importance of a display device is gradually increasing. In response to this, various display devices are being developed, and display devices including organic light emitting diodes (OLEDs) and micro light emitting diodes (Micro-LEDs), which are self-light emitting elements, are being developed.

Recently, as an information transmission medium, there has been a tendency for display devices to be installed and used in facilities, such as an instrument panel of a vehicle and an inner and outer wall of a building. Since the types and shapes of the facilities are diverse, forming a display device corresponding to each facility has limitations in terms of manufacturing cost and efficiency. Accordingly, instead of the conventional method of attaching a display device to a facility as a separate complete set, research on a method of realizing a display device by arranging a display element directly on a surface of the facility rather than a substrate is required.

The above information disclosed in this Background section is only for understanding of the background of the inventive concepts, and, therefore, it may contain information that does not constitute prior art.

SUMMARY

A technical problem to be solved by the present invention is that, when display elements are arranged on the surface of a facility, addressing of the display elements (that is, to specify relative positions of the display elements) is required in order to display an image through the display elements.

One or more embodiments of the inventive concepts described herein are capable of providing a display device capable of displaying an image based on relative positions of display elements disposed directly on a surface of a facility.

Additional features of inventive concepts as set forth in embodiments described hereinbelow will be set forth in the description which follows, and in part will be apparent from the description, or may be learned by practice of the inventive concepts.

In order to solve the above technical problems, a display device according to an embodiment may include a first display layer including a plurality of display elements disposed on one surface of a facility; a power supply which supplies a power signal to the display elements; and a signal controller which has an encoder for encoding first image data into second image data and supplies the second image data to the display elements.

Each of the display elements may include a base member; a pixel disposed along a surface of the base member; a driving circuit unit which has a decoder for decoding the second image data into the first image data and provides a pixel driving signal based on the second image data to the pixel; a first antenna unit which receives the power signal wirelessly and provides the power signal to the driving circuit unit; a second antenna unit which receives the second image data wirelessly and provides the second image data to the decoder; and a third antenna unit which transmits and receives an addressing signal for detecting a relative position between the display elements.

The encoder may encode the first image data into the second image data through a convolutional neural network (CNN).

The decoder may decode the second image data into the first image data through the convolutional neural network (CNN).

The second image data may include position information of the display elements, meta information of an image, and grayscale value information of the image.

The meta information may include shape information of an object included in the image, segmentation information of the image, and setting information on which mode of a 2D mode, a 3D mode, and a hologram mode to display the image.

The decoder may decode the second image data into the first image data using the shape information and the grayscale value information.

The decoder may include a central processing unit (CPU) and a graphics processing unit (GPU).

The driving circuit unit may include a power storage circuit which stores the power signal and outputs a first voltage signal; and a voltage control circuit which generates a second voltage signal and a third voltage signal based on the first voltage signal.

The driving circuit unit may include a position detection circuit which transmits and receives the addressing signal between the display elements using the third antenna unit to generate a position information signal of a corresponding display element; and a memory circuit which receives the position information signal and outputs the position information signal.

The position information signal may include vector values including distance and direction information between the display elements.

The encoder may add position information generated based on position information signals of all of the display elements when encoding the first image data.

The driving circuit unit may include a signal processing circuit which generates a pixel control signal based on the first image data, the second voltage signal, and the position information signal.

The driving circuit unit may include a pixel control circuit which provides the pixel driving signal to the pixel based on the pixel control signal and the third voltage signal.

The base member may be made of a silicon substrate and has a ball shape or spherical shape.

At least one of the first antenna unit, the second antenna unit, and the third antenna unit may be disposed along the surface of the base member.

The third antenna unit may use phonon communication or terahertz communication.

The pixel may include a first electrode layer disposed on the base member; a light emitting layer disposed on the first electrode layer; and a second electrode layer disposed on the light emitting layer, and at least one of the first electrode layer, the light emitting layer, and the second electrode layer may be curved along the surface of the base member.

The light emitting layer may include an organic material or an inorganic material.

The display elements may have a size of 1 um to 500 um.

The first display layer may include a fixing layer disposed on the display elements.

The display device may further include a second display layer disposed on the first display layer, and the second display layer may include the display elements.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the inventive concepts, and are incorporated in and constitute a part of this specification, illustrate embodiments of the inventive concepts, and, together with the description, serve to explain principles of the inventive concepts.

FIGS. 1A, 1B, and 1C are perspective views of a display device implemented on one surface of a facility according to an embodiment that is constructed according to principles of the invention.

DETAILED DESCRIPTION

Figure 1B:
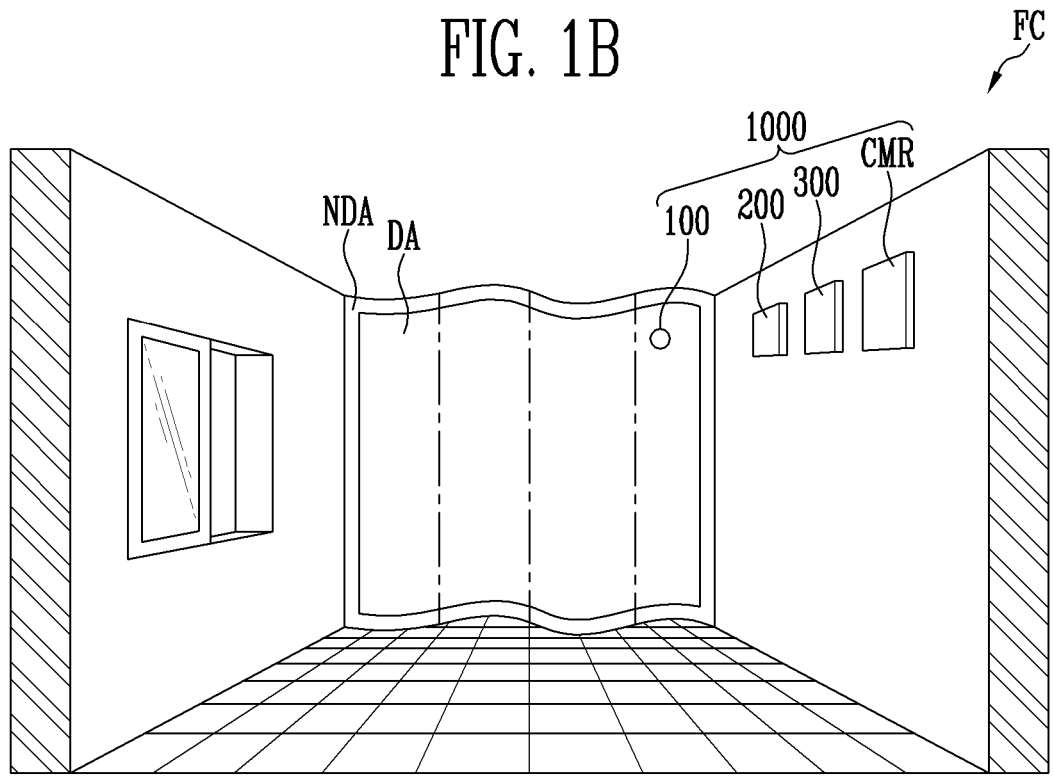

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the x, y, and z-axes, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, embodiments of the inventive concepts will be described in detail with reference to the accompanying drawings. The same or similar reference numerals are used for the same components in the drawings.

Figure 1C:
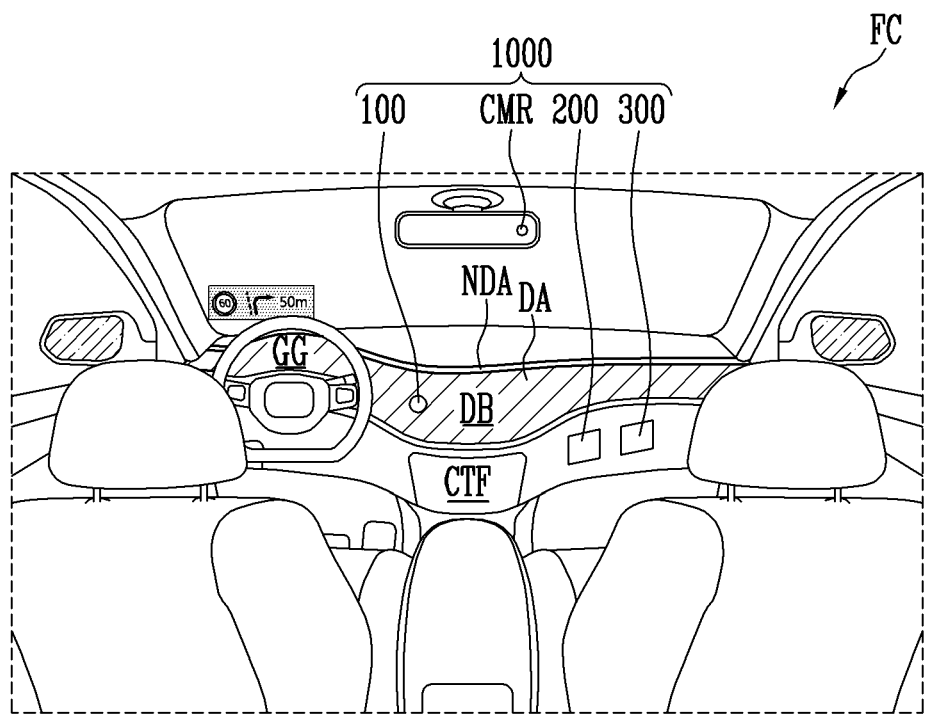
Figure 2:
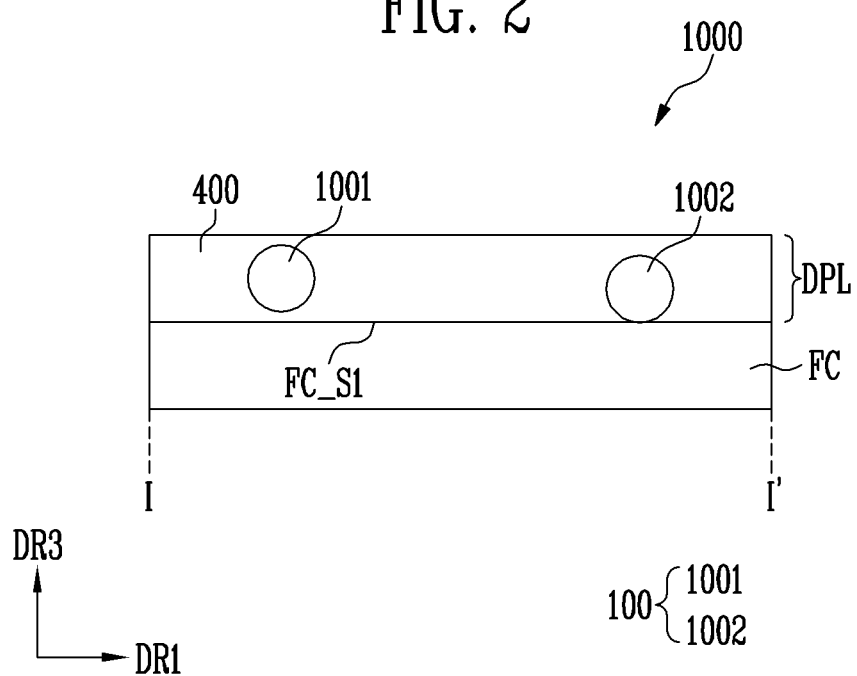
FIG. 2 is a cross-sectional view of the display device taken along line I-I' of FIG. 1A.
Figure 3:
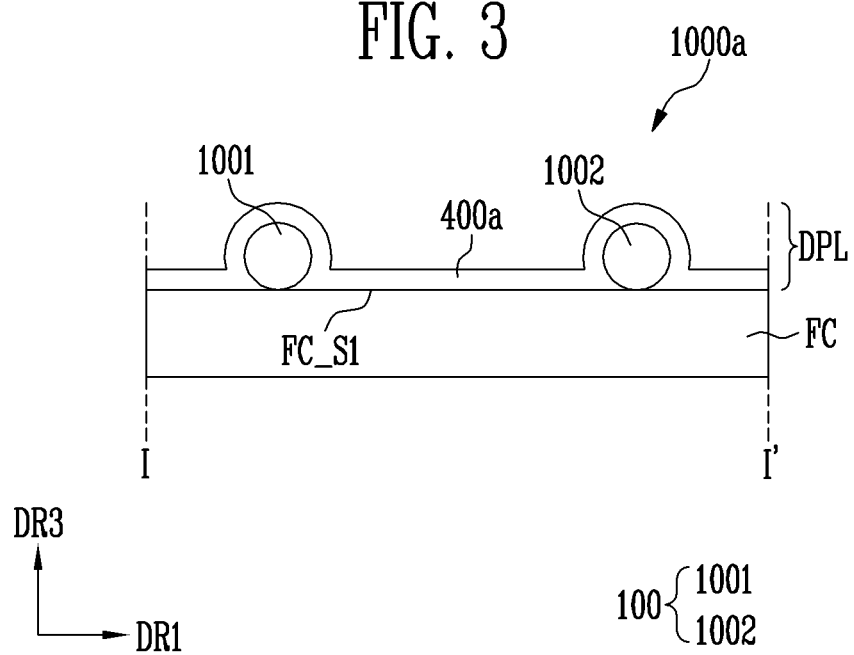
FIGS. 3 and 4 are cross-sectional views of display devices according to various embodiments, and are cross-sectional views corresponding to the line I-I' of FIG. 1A.
Figure 4:
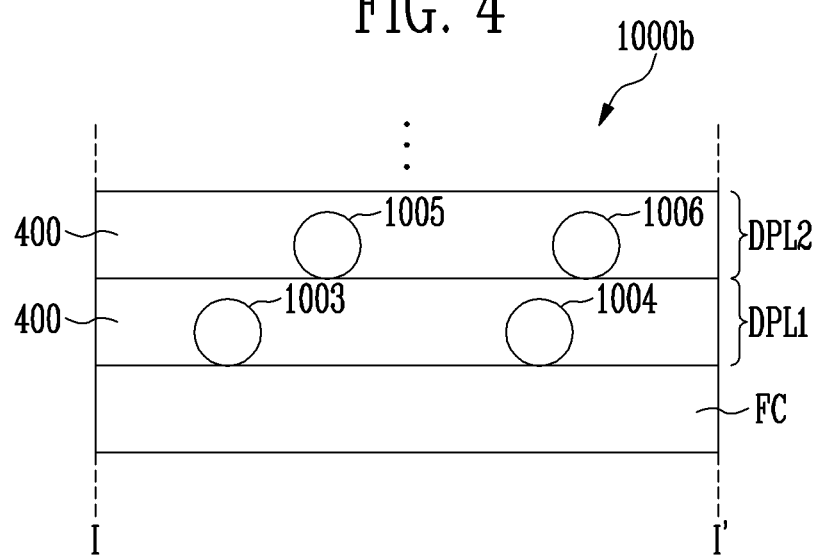
Figure 5:
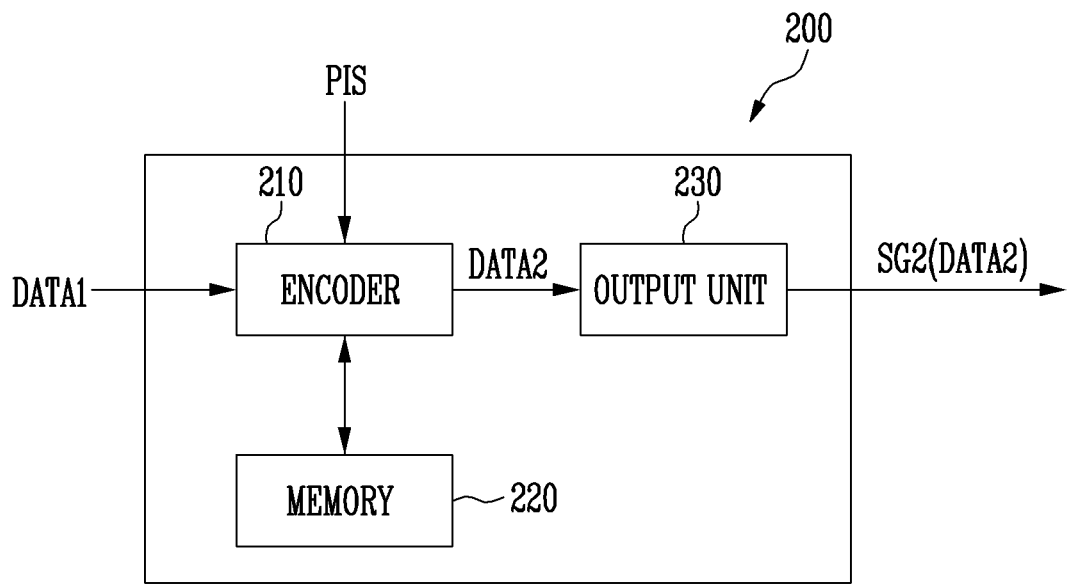
FIG. 5 is a block diagram schematically illustrating a configuration of a signal controller according to an embodiment.

FIGS. 1A to 1C are perspective views of a display device implemented on one surface of a facility according to an embodiment. FIG. 2 is a cross-sectional view of the display device taken along line I-I' of FIG. 1A. FIGS. 3 and 4 are cross-sectional views of display devices according to various embodiments, and are cross-sectional views corresponding to the line I-I' of FIG. 1A. FIG. 5 is a block diagram schematically illustrating a configuration of a signal controller according to an embodiment.

Referring to FIGS. 1A to 5, a display device 1000 may include a display layer DPL (refer to FIG. 2) including a plurality of display elements 100, a signal controller 200, and a power supply 300. The display device 1000 may further include a camera unit CMR.

According to an embodiment of the inventive concepts, the display elements 100 may be arranged on one surface of a facility FC. The facility FC may correspond to an object such as a building, tool, machine, or device made for a certain purpose. FIG. 1A shows an outer wall of a building as an example of the facility FC for convenience of description, but the type of the facility FC is not limited thereto. For example, the facility FC may be an inner wall of a building as shown in FIG. 1B. In this case, the inner wall of the building may be curved rather than flat. The display elements 100 may be arranged on the entire curved surface to implement the display device 1000. Also, the facility FC may be a vehicle as shown in FIG. 1C. In this case, the display elements 100 may be arranged on an instrument panel GG and a dashboard DB of the conventional vehicle to implement the display device 1000. According to an embodiment, the display elements 100 may be further arranged on a center fascia CTF to implement the display device 1000. In this case, FIGS. 1B and 1C exemplarily show the arrangement of the signal controller 200, the power supply 300, and the camera unit CMR for convenience of description, but the embodiments described herein are not limited thereto.

According to an embodiment of the present invention, the display elements 100 may be arranged on one surface of a display substrate instead of the facility FC. The display substrate may be a rigid substrate or a flexible substrate, and the material or physical properties thereof are not particularly limited. For example, the display substrate may be a rigid substrate made of glass or tempered glass, or a flexible substrate composed of a thin film made of plastic or metal. Also, the display substrate may be a transparent substrate, but is not limited thereto. For example, the display substrate may be a translucent substrate, an opaque substrate, or a reflective substrate.

Hereinafter, an embodiment in which the display elements 100 are arranged on one surface of the facility FC, such as an outer wall of a building, will be described. In this case, one surface of the facility FC may be flat. However, the embodiments described herein are not limited thereto, and one surface of the facility FC may include a curved surface.

One surface of the facility FC may include a display area DA in which an image is displayed and a non-display area NDA excluding the display area DA. The display area DA may be an area in which the display layer DPL is provided. The non-display area NDA may be an area in which the signal controller 200 providing an image signal to the display layer DPL, the power supply 300 providing a power signal to the display layer DPL, and the camera unit CMR capturing an object positioned in front of the display area DA are disposed.

The display area DA may have various shapes. For example, the display area DA may be provided in various shapes, such as a closed polygon including straight sides, a circle or an ellipse including a curved side, a semi-circle or a semi-ellipse including straight and curved sides.

When the display area DA includes a plurality of areas, each area may also be provided in various shapes, such as a closed polygon including straight sides, a semi-circle or a semi-ellipse including a curved side. Also, areas of the plurality of areas may be the same or different from each other. In an embodiment, a case in which the display area DA is provided as one area having a rectangular shape including straight sides will be described as an example.

The non-display area NDA may be provided on at least one side of the display area DA. In an embodiment of the present invention, the non-display area NDA may surround the display area DA.

Referring to FIGS. 1A and 2, the display layer DPL may be provided in the display area DA on one surface of the facility FC. The display layer DPL may include the plurality of display elements 100 and a fixing layer 400 fixing the display elements 100.

The display elements 100 may receive the image signal and the power signal from the signal controller 200 and the power supply 300 to display an image corresponding to the provided signals. Each of the display elements 100 may emit light of various colors, such as red, green, and blue. However, the type of light emitted by the display elements 100 is not limited thereto. For example, each of the display elements 100 may display an image by emitting red, green, blue, and yellow light.

The display elements 100 may further include components (for example, an antenna) for wirelessly receiving the image signal and the power signal from the signal controller 200 and the power supply 300. The display elements 100 may further include a signal processing circuit for processing the provided image signal, a power control circuit for storing and controlling the provided power signal, and the like. A detailed structure and operation of the display elements 100 will be described later with reference to FIGS. 6 to 11.

The display elements 100 may be dispersed in the fixing layer 400 and disposed in various positions. That is, distances between the display elements 100 may be different from each other, but are not limited thereto and may be the same as each other.

The fixing layer 400 may be a medium in which the display elements 100 are dispersed, and may be formed of various resin compositions that may be generally referred to as binders. However, the present invention is not limited thereto, and in the present specification, any medium in which the display elements 100 can be dispersed and arranged may be referred to as the fixing layer 400 regardless of its name, additional functions, constituent materials, and the like.

The fixing layer 400 may be formed to be thicker than the thickness of the display elements 100 to fill a space between the display elements 100 and may be disposed generally flat. That is, the top surface of the fixing layer 400 may be generally flat.

In this case, the display elements 100 dispersed in the fixing layer 400 may be arranged in various positions. For example, a display element 1001 may be arranged in the fixing layer 400 so as not to contact the upper surface FC_S1 of the facility FC. As another example, a display element 1002 may be arranged to be in contact with the upper surface FC_S1 of the facility FC.

The shape of the fixing layer 400 is not limited to the above descriptions. In another embodiment, as shown in FIG. 3, a display device 1000a may include a fixing layer 400a disposed to have an approximately uniform thickness along the surface. That is, the fixing layer 400a may be disposed along the surface shape of the display elements 100 arranged on the upper surface FC_S1 of the facility FC. In this case, the display elements 100 may be in contact with the upper surface FC_S1 of the facility FC, but the present invention is not limited thereto.

On the other hand, as shown in FIGS. 2 and 3, the display layer DPL may be configured as a single layer and may be disposed on one surface of the facility FC, but the embodiments described herein are not limited thereto. As another embodiment, as shown in FIG. 4, a display device 1000b may include a plurality of display layers DPL1 and DPL2. Specifically, the display device 1000b may include a first display layer DPL1 disposed on one surface of the facility FC and a second display layer DPL2 disposed on the first display layer DPL1. Each of the first display layer DPL1 and the second display layer DPL2 may include the fixing layer 400 and the display elements 100 dispersed in the fixing layer 400.

Positions in which display elements 1003 and 1004 of the first display layer DPL1 and display elements 1005 and 1006 of the second display layer DPL2 are arranged may be different from each other. Some of the display elements 1003 and 1004 of the first display layer DPL1 and the display elements 1005 and 1006 of the second display layer DPL2 may overlap each other along a third direction DR3. For example, a display element 1004 of the first display layer DPL1 may overlap a display element 1006 of the second display layer DPL2 in the third direction DR3.

Although FIG. 4 shows a structure in which the display device 1000b includes two display layers DPL1 and DPL2 as an example, the display device 1000b may include three or more display layers. In some embodiments, when the display device 1000b includes a plurality of display layers, the display device 1000b may function as a stereoscopic image display device for displaying a 3D stereoscopic image or a holographic stereoscopic image.

Referring back to FIG. 1A, the signal controller 200 may be disposed in the non-display area NDA on one surface of the facility FC. The signal controller 200 may provide the image signal to the display elements 100 and control driving of the display elements 100.

The signal controller 200 and the display elements 100 may be disposed to be spaced apart from each other. That is, the signal controller 200 and the display elements 100 may not be connected to each other, and the signal controller 200 may provide the image signal to the display elements 100 through wireless communication. Accordingly, the signal controller 200 may include a signal generating/transmitting element for the wireless communication, and each of the display elements 100 may include a signal receiving element such as an antenna to receive the provided signal.

The signal controller 200 may provide the image signal to the display elements 100 through various communication methods such as infrared ray communication and radio frequency communication, but the present invention is not limited thereto.

The signal controller 200 may be disposed adjacent to an area in which the display elements 100 are arranged on one surface of the facility FC. However, a position where the signal controller 200 is disposed is not limited thereto. For example, when the facility FC is a building, the signal controller 200 may be disposed inside the building.

Referring to FIGS. 1A and 5, the signal controller 200 may include an encoder 210, a memory 220, and an output unit 230.

The encoder 210 may encode first image data DATA1 received from outside into second image data DATA2. The encoder 210 may be implemented with one or more processors. For example, the encoder 210 may include a central processing unit and a graphics processing unit. The encoder 210 may execute an instruction or command stored in the memory 220 to perform a predetermined operation.

According to an embodiment, the second image data DATA2 may include grayscale value information of the image, meta information of the image, and position information of the display elements 100. The encoder 210 may image-process the first image data DATA1 using a convolutional neural network (CNN). The convolutional neural network (CNN) may encode the first image data DATA1 to generate the second image data DATA2. The second image data DATA2 may include data obtained by extracting predetermined compressed information (that is, the grayscale value information of the image and the meta information of the image) from the first image data DATA1.

According to an embodiment, the convolutional neural network (CNN) may be provided in the encoder 210. However, the present invention is not limited thereto. For example, the convolutional neural network (CNN) may be provided in an external device such as a cloud server, and the signal controller 200 may use the convolutional neural network (CNN) provided in the external device through a communication interface or the like. Hereinafter, for convenience of description, an embodiment in which the convolutional neural network (CNN) is provided in the encoder 210 will be mainly described.

The convolutional neural network (CNN) may include a plurality of layers and have a single forward pass structure. According to an embodiment, the convolutional neural network (CNN) may include a combination of at least one convolutional layer and at least one maximum pooling layer. For example, the convolutional neural network (CNN) may have a structure in which an arrangement of a predetermined number of convolutional layers and maximum pooling layers is repeated. The first image data DATA1 input to the convolutional neural network (CNN) may be sequentially processed and transmitted through the plurality of layers.

The convolutional neural network (CNN) may repeatedly perform the process of extracting only main feature values from intermediate data by processing the intermediate data, which is the result of processing the first image data DATA1 through the predetermined number of convolutional layers, using the maximum pooling layer. The convolutional neural network (CNN) may generate the second image data DATA2 in which the amount of data is reduced from the first image data DATA1.

Also, when encoding the first image data DATA1, the encoder 210 may extract the meta information of the image from the first image data DATA1 and add the meta information to the second image data DATA2. In this case, the meta information may include shape information of an object included in the image, segmentation information of the image, and setting information on which mode of a 2D mode, a 3D mode, and a hologram mode to display the image.

When encoding the first image data DATA1, the encoder 210 may receive a position information signal PIS (refer to FIG. 9) received from the display elements 100 and add the position information of the display elements 100 to the second image data DATA2. The position information signal PIS may include relative position information of the remaining display elements 100 with respect to a reference display element 100 specified among the display elements 100 included in the display device 1000.

According to an embodiment, the second image data DATA2 may be configured in a matrix form as follows.

$$DATA2 = \begin{pmatrix} C^P1 & C^P2 & C^P3 & ... \\ C^{DS}1 & C^{DS}2 & C^{DS}3 & ... \\ R1 & R2 & R3 & ... \\ G1 & G2 & G3 & ... \\ B1 & B2 & B3 & ... \\ Y1 & Y2 & Y3 & ... \end{pmatrix}$$

In this case, $C^P1$, $C^P2$, $C^P3$, and the like may be the position information of the display elements 100, $C^{DS}1$, $C^{DS}2$, $C^{DS}3$, and the like may be meta information of the display elements 100, R1, R2, R3, and the like may be information on a red grayscale value of the image, G1, G2, G3, and the like may be information on a green grayscale value of the image, B1, B2, B3, and the like may be information on a blue grayscale value of the image, and Y1, Y2, Y3, and the like may be information on a yellow grayscale value of the image.

The memory 220 may store computer program instructions, information, and contents necessary for the operation of the signal controller 200. The memory 220 may include a volatile storage medium, a non-volatile storage medium, or a combination thereof. The memory 220 may be implemented with various types of storage media. The memory 220 may include at least one type of storage medium among a flash memory type, a hard disk type, a multimedia card micro type, a card type memory (for example, SD or XD memory), RAM (Random Access Memory), SRAM (Static Random Access Memory), ROM (Read-Only Memory), EEPROM (Electrically Erasable Programmable Read-Only Memory), PROM (Programmable Read-Only Memory), a magnetic memory, a magnetic disk, and an optical disk.

The output unit 230 may provide an image signal SG2 (or the second image data DATA2) generated by the signal controller 200 (or the encoder 210) to the specified reference display element 100. The output unit 230 may include a communication interface. The communication interface may transmit/receive signals to and from a second antenna unit and a third antenna unit of a display element 100 to be described later.

Referring back to FIG. 1A, the power supply 300 may be disposed in an area adjacent to the display area DA to supply the power signal to the display elements 100. For convenience of description, although FIG. 1A shows an embodiment in which the power supply 300 is disposed adjacent to an area in which the display elements 100 are arranged on one surface of the facility FC, the embodiments described herein are not limited thereto, and may be disposed to be spaced apart. For example, when the facility FC is a building, the power supply 300 may be disposed inside the building.

That is, the power supply 300 may wirelessly transmit a power to the display elements 100. Accordingly, the power supply 300 may include a power transmission element for wirelessly transmitting the power, and each of the display elements 100 may include a power receiving element such as an antenna to receive the provided power. For example, the power supply 300 may transmit the power to the display elements 100 using an electromagnetic induction method or a magnetic resonance method, but the present invention is not limited thereto.

When the display elements 100 are arranged on the display substrate, the power supply 300 may be disposed under the display substrate to supply the power signal to the display elements 100. In this case, the power supply 300 may be disposed to overlap the display area DA of the display substrate, or may be disposed to overlap both the display area DA and the non-display area NDA. However, the position of the power supply 300 is not limited thereto, and may be disposed only in the non-display area NDA or may be disposed outside the display substrate.

The camera unit CMR may be disposed in an area adjacent to the display area DA and may capture the object (for example, a person viewing the display device 1000) positioned in front of the display area DA. The camera unit CMR may provide the captured image data to the signal controller 200. The signal controller 200 may supply the image data captured by the camera unit CMR to the display elements 100 for display, or may receive the image data stored in advance corresponding to the object positioned in front of the display area DA from the external device (for example, the cloud server) and supply the image data to the display elements 100 for display. Accordingly, the display device 1000 may display an image that meets a viewer's interest.

Figure 6:
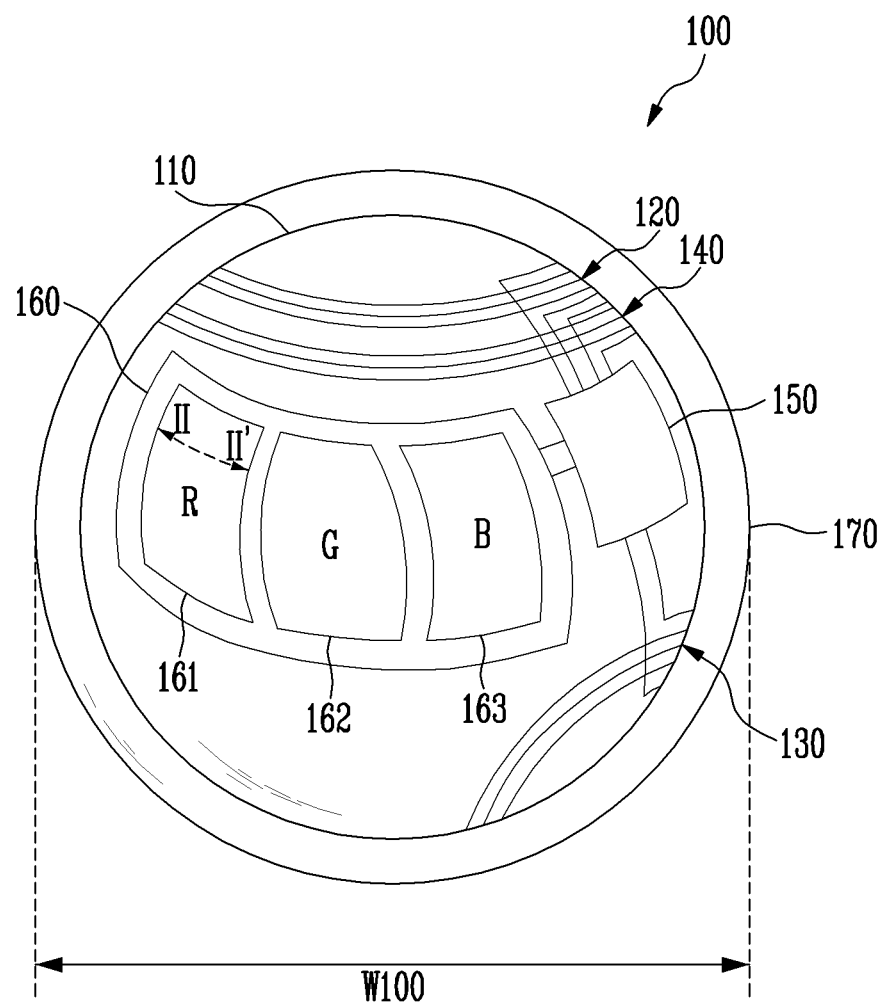
FIG. 6 is a perspective view of a display element according to an embodiment.
Figure 7:
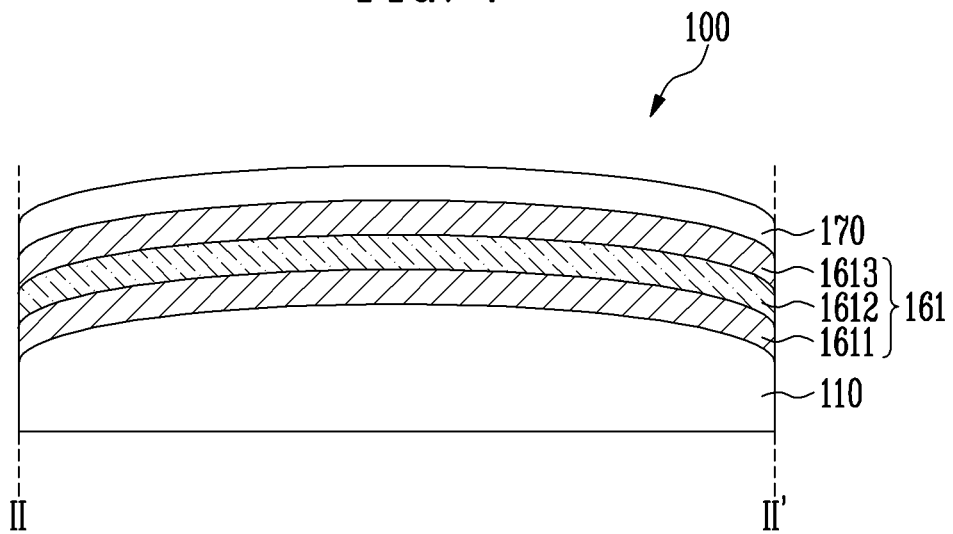
FIG. 7 is a cross-sectional view of the display element taken along line II-II' of FIG. 6.
Figure 8:
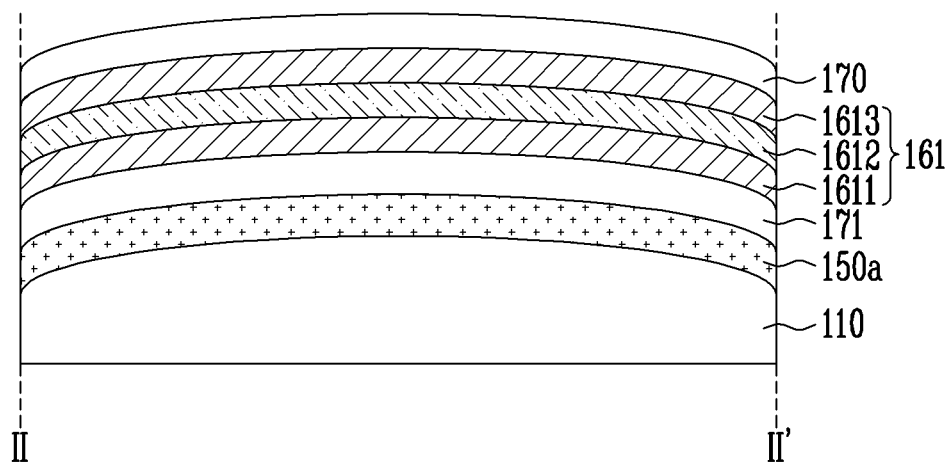
FIG. 8 is a cross-sectional view corresponding to the line II-II' of FIG. 6 as a modified example of the display element shown in FIG. 7.

FIG. 6 is a perspective view of a display element according to an embodiment of. FIG. 7 is a cross-sectional view of the display element taken along line II-II' of FIG. 6. FIG. 8 is a cross-sectional view corresponding to the line II-II' of FIG. 6 as a modified example of the display element shown in FIG. 7.

Referring to FIGS. 6 to 8, the display element 100 may include a base member 110, a first antenna unit 120, a second antenna unit 130, a third antenna unit 140, a driving circuit unit 150, a pixel unit 160, and an encapsulation film 170.

The base member 110 may provide a space in which various components of the display element 100 are arranged. The base member 110 may be formed of a conductive substrate or an insulating substrate. For example, the base member 110 may be a substrate including various materials such as a silicon substrate, a sapphire substrate, a glass substrate, a silicon carbide substrate, a conductive substrate made of a conductive material, and a semiconductor substrate.

Shape of the base member 110 is not particularly limited. For example, the base member 110 may have a ball shape or spherical shape as shown in FIG. 6. In FIGS. 6 to 8, although the base member 110 and the display element 100 including the base member 110 are described as having the ball shape or spherical shape, the shapes of the base member 110 and the display element 100 according to another embodiment will be described later with reference to FIGS. 10 and 11.

When the base member 110 is formed in the ball shape or spherical shape, the base member 110 may be formed by free-falling a molten base material (for example, silicon).

The first antenna unit 120 may be disposed in one area of the base member 110. The first antenna unit 120 may be composed of a conductive pattern including a conductive material, and may receive the power signal from the power supply 300 (refer to FIG. 1A). For example, the first antenna unit 120 may receive power.

FIG. 6 shows, as an example, a structure in which the first antenna unit 120 is formed in a spiral shape surrounding the curved surface of the base member 110. That is, the first antenna unit 120 may be a helical antenna, but is not limited thereto. The first antenna unit 120 may be composed of various power receiving elements such as a loop-type antenna.

The second antenna unit 130 may be disposed in one area of the base member 110 so as not to overlap the first antenna unit 120. The second antenna unit 130 may be composed of a conductive pattern including a conductive material, and may receive the second image data DATA2 from the signal controller 200 (refer to FIG. 1A). For example, the second antenna unit 130 may receive the image signal. The second antenna unit 130 may be composed of an antenna of various shapes like the first antenna unit 120.

The third antenna unit 140 may be disposed in one area of the base member 110 so as not to overlap the first and second antenna units 120 and 130. The third antenna unit 140 may be composed of a conductive pattern including a conductive material. Each of the plurality of display elements 100 may communicate with each other using the third antenna unit 140 to calculate relative position information between the display elements 100. For example, relative positions of the remaining display elements 100 may be determined based on the reference display element 100 among the display elements 100. For communication between the display elements 100, phonon communication using a phonon, or terahertz communication such as 6G communication having a tera-level (Tbps) transmission rate may be used.

The driving circuit unit 150 may be disposed on the base member 110. The driving circuit unit 150 may receive the power signal, the image signal, and a position signal, and may generate a pixel driving signal for driving the pixel unit 160 based on them. For example, the driving circuit unit 150 may receive the power signal from the first antenna unit 120, receive the image signal from the second antenna unit 130, and receive the position signal from the third antenna unit 140.

The driving circuit unit 150 may include various circuit elements for processing signals and generating signals, and may be disposed on the base member 110. Various components included in the driving circuit unit 150 will be described later with reference to FIG. 9.

The driving circuit unit 150 may be partially formed on the surface of the base member 110, but the present invention is not limited thereto. The driving circuit unit 150 may be entirely formed on the surface of the base member 110 in an area that does not overlap the first antenna unit 120, the second antenna unit 130, the third antenna unit 140, and the pixel unit 160.

The pixel unit 160 may be disposed on the base member 110. The pixel unit 160 may emit light of various colors in response to the pixel driving signal provided from the driving circuit unit 150. The pixel unit 160 may include a first pixel 161, a second pixel 162, and a third pixel 163.

The first pixel 161, the second pixel 162, and the third pixel 163 may be pixels emitting light of different colors.

For example, the first pixel 161 may emit light of a first color, the second pixel 162 may emit light of a second color different from the first color, and the third pixel 163 may emit light of a third color different from the first color and the second color.

According to an embodiment, the first pixel 161 may be a red pixel emitting red light, the second pixel 162 may be a green pixel emitting green light, and the third pixel 163 may a blue pixel emitting blue light. The color of light emitted by each of the pixels 161, 162, and 163 is not limited thereto. In another embodiment, each of the pixels 161, 162, and 163 may emit one color of cyan, magenta, yellow, and white. Accordingly, the pixel unit 160 may display light of various colors by combining the light of different colors emitted by each of the pixels 161, 162, and 163.

According to another embodiment, the pixel unit 160 may include the first pixel 161, the second pixel 162, the third pixel 163, and a fourth pixel. The first pixel 161, the second pixel 162, the third pixel 163, and the fourth pixel may be pixels emitting light of different colors. For example, the first pixel 161 may emit light of a first color, the second pixel 162 may emit light of a second color different from the first color, the third pixel 163 may emit light of a third color different from the first color and the second color, and the fourth pixel may emit light of a fourth color different from the first color, the second color, and the third color. According to an embodiment, the first pixel 161 may be a red pixel emitting red light, the second pixel 162 may be a green pixel emitting green light, the third pixel 163 may be a blue pixel emitting blue light, and the fourth pixel may be a yellow pixel emitting yellow light.

Since cross-sectional structures of the pixels may be substantially the same or similar to each other, a structure of the first pixel 161 will be described below, and descriptions of structures of the second pixel 162, the third pixel 163, and the fourth pixel will be simplified or omitted for ease in explanation of the embodiment.

As shown in FIG. 7, the first pixel 161 may include a first electrode layer 1611, a light emitting layer 1612, and a second electrode layer 1613 sequentially stacked between the base member 110 and the encapsulation film 170.

The first electrode layer 1611 may be formed to have an approximately uniform thickness along the surface of the base member 110. The first electrode layer 1611 may include a conductive material such as metal. For example, the first electrode layer 1611 may be a metal layer including metal such as Ag, Mg, Al, Pt, Pd, Au, Ni, Nd, Ir, and Cr. As another example, the first electrode layer 1611 may further include a metal oxide layer, and may have a two-layer structure such as ITO/Ag, Ag/ITO, ITO/Mg, and ITO/MgF, or a multi-layer structure such as ITO/Al/ITO. However, the material of the first electrode layer 1611 is not limited to the above-described materials as long as it is a material capable of transmitting the provided electrical signal.

The light emitting layer 1612 may be disposed on the first electrode layer 1611. The light emitting layer 1612 may include an organic light emitting layer including an organic material or an inorganic light emitting layer including an inorganic material to emit light of a predetermined color.

As an example, when the light emitting layer 1612 includes the organic light emitting layer, the light emitting layer 1612 may include a hole transporting layer, an organic material layer, and an electron transporting layer.

As another example, when the light emitting layer 1612 includes the inorganic light emitting layer, the light emitting layer 1612 may include a first semiconductor layer doped with a p-type dopant such as Mg, Zn, Ca, Sr, and Ba, a second semiconductor layer doped with an n-type dopant such as Si, Ge, and Sn, and an active layer (for example, a quantum well layer) disposed between the first semiconductor layer and the second semiconductor layer.

The second electrode layer 1613 may be disposed on the light emitting layer 1612. The second electrode layer 1613 may include a conductive material layer having a small work function, such as Li, Ca, LiF/Ca, LiF/Al, Al, Mg, Ag, Pt, Pd, Ni, Au Nd, Ir, Cr, BaF, Ba, or a compound or mixture thereof (for example, a mixture of Ag and Mg). The second electrode layer 1613 may further include a transparent metal oxide layer disposed on the conductive material layer having a small work function.

The above-described first electrode layer 1611, the light emitting layer 1612, and the second electrode layer 1613 may be arranged to be bent by the curvature of the surface of the base member 110.

The first electrode layer 1611 may be directly formed on the base member 110, but other components may be further disposed between the first electrode layer 1611 and the base member 110. For example, as shown in FIG. 8, at least a portion of a driving circuit unit 150*a* may be further disposed between the first electrode layer 1611 of a display element 100*a* and the base member 110. For example, the driving circuit unit 150*a* may be formed on the base member 110, a first encapsulation film 171 may be formed on the driving circuit unit 150*a*, and the first pixel 161 may be formed on the first encapsulation film 171. When the driving circuit unit 150*a* and the pixel unit 160 are formed in a stacked structure as in the present embodiment, a space in which the pixel unit 160 is to be formed can be secured widely. Accordingly, display luminance of the display element 100 can be improved.

The encapsulation film 170 may be disposed at the outermost portion of the display element 100 to protect the components disposed on the base member 110. The encapsulation film 170 may contain an inorganic material such as silicon oxide, silicon nitride, silicon oxynitride, aluminum oxide, aluminum nitride, titanium oxide, and titanium nitride, or an organic material such as polyimide, polyester, and acrylic, and may be formed in a stacked structure including the above-described materials.

As described above, when the display element 100 is formed in the ball shape or spherical shape, the display element 100 may be formed in a small size having a diameter W100 (or size) of 1 μm to 500 μm. For example, the diameter W100 of the display element 100 may be 100 μm or less.

Figure 9:
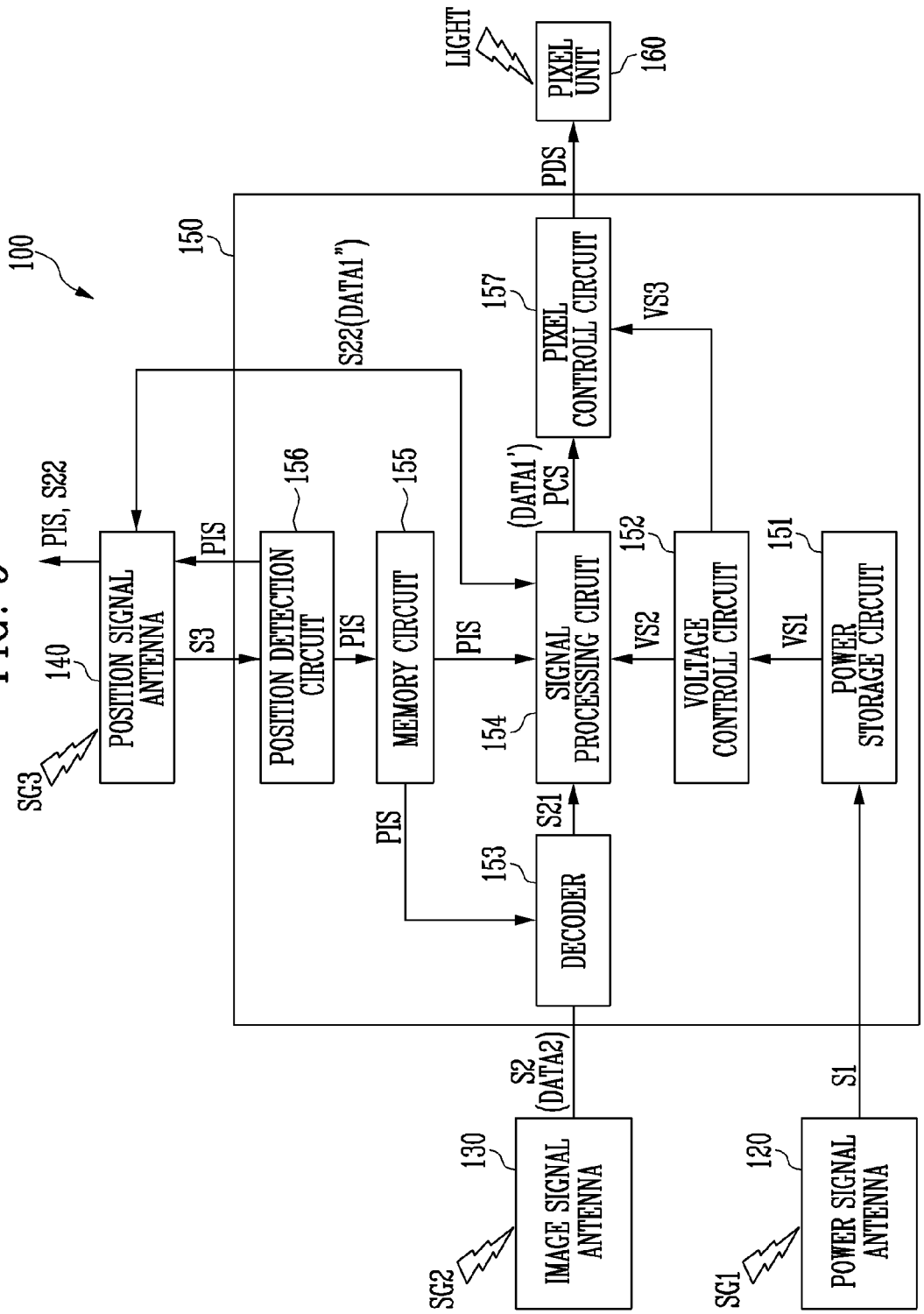
FIG. 9 is a block diagram schematically illustrating a configuration of the display element according to an embodiment.

FIG. 9 is a block diagram schematically illustrating a configuration of the display element according to an embodiment. In particular, FIG. 9 shows various configurations included in the driving circuit unit 150.

Referring to FIGS. 1A, 6, and 9, the display element 100 may include the first antenna unit 120, the second antenna unit 130, the third antenna unit 140, the driving circuit unit 150, and the pixel unit 160 disposed on the base member 110. In this case, although the second antenna unit 130 and the third antenna unit 140 are shown as separate components in FIG. 9, they may be integrated.

The first antenna unit 120 may receive a power signal SG1 from the power supply 300 (refer to FIG. 1A). As described above, the first antenna unit 120 may receive the power signal SG1 from the power supply 300 through various methods such as an electromagnetic induction method or a magnetic resonance method.

The first antenna unit 120 may transmit the power signal SG1 provided from the power supply 300 to the driving circuit unit 150. Specifically, the first antenna unit 120 may provide the power signal S1 to a power storage circuit 151 of the driving circuit unit 150.

The power storage circuit 151 may receive the power signal S1 from the first antenna unit 120 and store the power signal S1 therein. For example, the power storage circuit 151 may include a capacitor capable of storing the power signal S1 for a short period of time or for a long period of time. If necessary, the power storage circuit 151 may provide the power stored therein to a voltage control circuit 152 as a first voltage signal VS1.

The voltage control circuit 152 may generate a second voltage signal VS2 and a third voltage signal VS3 based on the first voltage signal VS1 provided from the power storage circuit 151. The voltage control circuit 152 may include a voltage divider for dividing the provided first voltage signal VS1 into voltages having various magnitudes, and may provide the divided voltages to other components. Accordingly, the voltage control circuit 152 may generate the second voltage signal VS2 and provide the second voltage signal VS2 to a signal processing circuit 154, and may generate the third voltage signal VS3 and provide the third voltage signal VS3 to a pixel control circuit 157.

The second antenna unit 130 may transmit the image signal SG2 provided from the signal controller 200 to the driving circuit unit 150. Specifically, the second antenna unit 130 may provide the image signal S2 (or the second image data DATA2) to a decoder 153 of the driving circuit unit 150.

As described above, the second image data DATA2 may be data obtained by encoding the first image data DATA1 through the convolutional neural network (CNN), and may include the grayscale value information of the image, the meta information of the image, and the position information of the display elements although the size of the data is smaller than that of the first image data DATA1. Therefore, when decoding through the convolutional neural network (CNN), information of the first image data DATA1 may be restored without loss.

The decoder 153 may decode the second image data DATA2 into the first image data DATA1 through the convolutional neural network (CNN). The decoder 153 may be implemented with one or more processors. For example, the decoder 153 may include a central processing unit and a graphics processing unit.

Specifically, when decoding the second image data DATA2, the decoder 153 may generate a twenty-first image signal S21 (or the first image data DATA1) corresponding to each of the display elements 100 base on the position information signal PIS received from the remaining display elements 100 except for a corresponding display element 100 (that is, the reference display element 100). In this case, the twenty-first image signal S21 (or the first image data DATA1) may include first 'image data DATA1' corresponding to the pixel unit 160 of the display element 100 (hereinafter, referred to as the reference display element) receiving an image signal S2 (or the second image data DATA2) and first "image data DATA1" corresponding to each pixel unit 160 of the remaining display elements 100 other than the reference display element 100. According to an embodiment, only one reference display element 100 may exist in the display area DA. However, the present invention is not limited thereto, and a plurality of reference display elements 100 may be set in proportion to the size of the display area DA.

A twenty-second image signal S22 (or the first "image data DATA1") may be transmitted to the remaining display elements 100 other than the reference display element 100 through the third antenna unit 140.

Also, the decoder 153 may restore the meta information when decoding the second image data DATA2. In this case, the meta information may include the shape information (or structure information) of the object included in the image, the segmentation information of the image, and the setting information on which mode of a 2D mode, a 3D mode, and a hologram mode to display the image. According to an embodiment, the decoder 153 may decode the second image data DATA2 into the first image data DATA1 based on the grayscale value information and the shape information included in the meta information.

The twenty-first image signal S21 (that is, the first 'image data DATA1' and the first "image data DATA1") provided to the signal processing circuit 154 may be a signal including information on emission color, emission intensity, emission time, and the like of the display elements 100.

As described above, unlike the conventional driving method of displaying an image in units of scan lines based on fixed positions of the display elements 100, the display device 1000 of the present invention may display the image in the display area DA by dividing the image data into sub-image data based on the relative positions of the remaining display elements 100 with respect to the reference display element 100, and emitting light based on the sub-image data corresponding to each display element. For this reason, compared with the conventional sequential scan driving method, the display device 1000 according to the embodiment of the present invention can display the image substantially simultaneously over the entire display area DA without delay.

As shown in FIG. 6, shapes of the first antenna unit 120, the second antenna unit 130, and the third antenna unit 140 described above may have the same shape as a coil provided on each area of the base member 110, but are not particularly limited as long as they have a structure capable of receiving the power signal SG1, the image signal SG2, and a position signal SG3. For example, the first antenna unit 120, the second antenna unit 130, and the third antenna unit 140 may be one of known antennas having various structures. As an embodiment, the first antenna unit 120, the second antenna unit 130, and the third antenna unit 140 may include a dipole antenna. When the first antenna unit 120, the second antenna unit 130, and the third antenna unit 140 include the dipole antenna, it may be advantageous for downsizing the display device 100. In addition, the display element 100 may effectively receive a signal having a short wavelength through the first antenna unit 120, the second antenna unit 130, and the third antenna unit 140.

The relative position information between the display elements 100 of the corresponding display element 100 may be recorded in a memory circuit 155.

A position detection circuit 156 may generate the position information signal PIS of each display element 100 by using communication between the plurality of display elements 100 applied on one surface of the facility FC. Specifically, positions of some of the display elements 100 (that is, the reference display element 100) applied on one surface of the facility FC may be recorded, and positions of the remaining display elements 100 included in the display area DA may be recorded based on reference display elements 100 on which the positions are recorded.

For example, among the display elements 100 applied on one surface of the facility FC, the reference display element 100 may communicate with other display elements 100 using the third antenna unit 140 to receive the position signal SG3 of each display element 100. The third antenna unit 140 may provide a position information signal S3 to the position detection circuit 156. The communication between the display elements 100 may use phonon communication using a phonon or terahertz communication.

According to an embodiment, the position detection circuit 156 may determine (or address) the relative position between the plurality of display elements 100 disposed in the display area DA using Equation 1 below.

$$Xn = \sum_{i=1}^{n-1} (C^P i * Xi) \quad \text{[Equation 1]}$$

In this case, $C^P i$ may be a position constant having a vector value including the direction and distance of an i-th display element, and Xi is an eigenvector of the i-th display element.

Each of the plurality of display elements 100 may store the $\Sigma_{i=1}^{n-1}(C^P i)$ value as the position information in the memory circuit 155.

The signal processing circuit 154 may generate a pixel control signal PCS (or the first 'image data DATA') and the twenty-second image signal S22 (or the first "image data DATA1") based on the twenty-first image signal S21 provided from the decoder 153, a second voltage signal VS2 provided from the voltage control circuit 152, and a position information signal S21 provided from the memory circuit 155. In this case, the pixel control signal PCS may include information on the emission luminance, emission color, and emission time of the corresponding display element 100. The twenty-second image signal S22 may include the first "image data DATA1" corresponding to each pixel unit 160 of the remaining display elements 100 other than the reference display element 100. The twenty-second image signal S22 may be transmitted to the remaining display elements 100 through the third antenna unit 140.

The signal processing circuit 154 may specify the image signal corresponding to the corresponding display element 100 by comparing the position information of the display elements 100 included in the provided twenty-first image signal S21 with the position information of the corresponding display element 100 stored in advance in the memory circuit 155. That is, the image signal S2 provided from the second antenna unit 130 may include image signals for the plurality of display elements 100 disposed on the display substrate, and the signal processing circuit 154 may generate the pixel control signal PCS by specifying only an image signal required for the corresponding display element 100 among these image signals.

For example, the signal processing circuit 154 may generate the pixel control signal PCS by specifying the first 'image data DATA1' as an image signal required for the reference display element 100, and transmit the first "image data DATA", which is an image signal required for the remaining display elements 100, as the twenty-second image signal S22 to each of the remaining display elements 100 through the third antenna unit 140. In this case, the signal processing circuit 154 of each of the remaining display elements 100 may generate the pixel control signal PCS by specifying any one data of the first "image data DATA1" as an image signal required for the signal processing circuit 154 based on the position information.

The pixel control circuit 157 may generate a pixel driving signal PDS based on the pixel control signal PCS provided from the signal processing circuit 154 and the third voltage signal VS3. That is, the pixel driving signal PDS may be a driving current or a driving voltage for substantially driving the pixel unit 160. The pixel unit 160 may emit light with emission luminance, emission color, and emission time corresponding to the pixel driving signal PDS.

Figure 10:
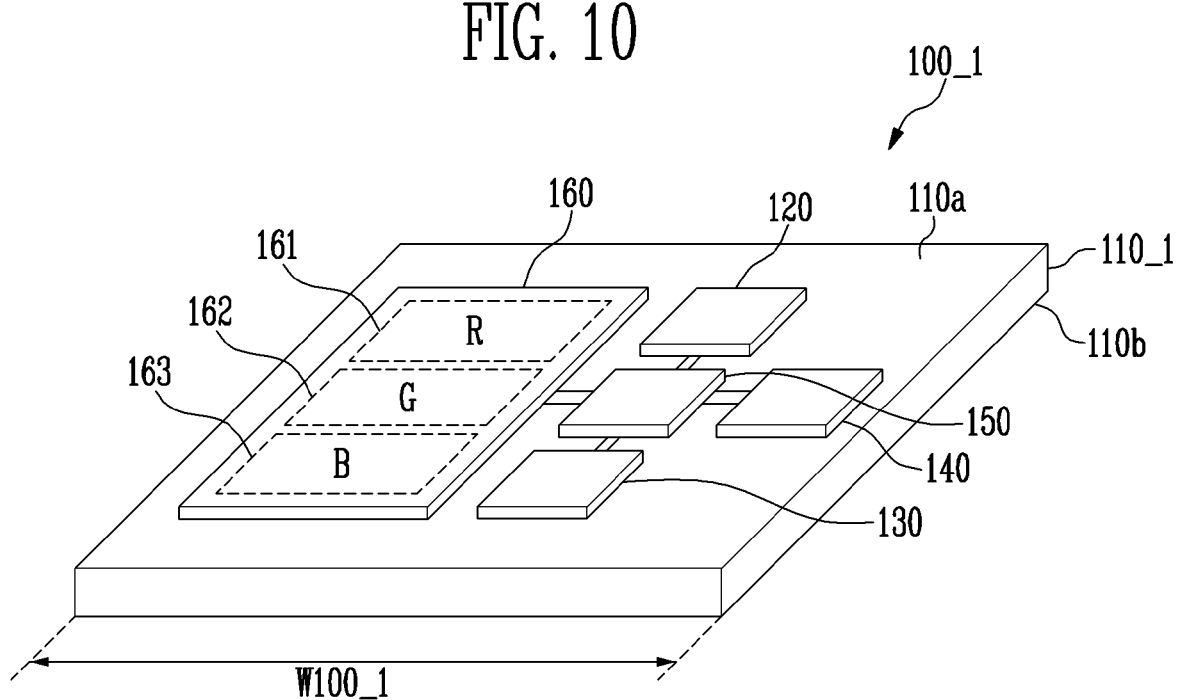
FIGS. 10 and 11 are perspective views of display elements according to various embodiments.
Figure 11:
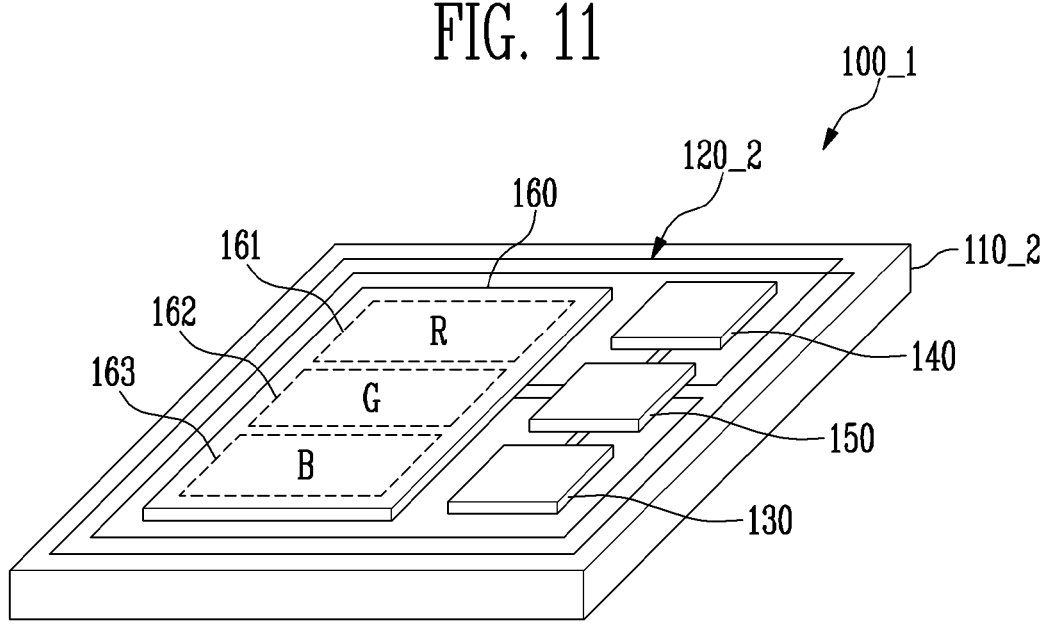

FIGS. 10 and 11 are perspective views of display elements according to various embodiments.

Embodiments of FIGS. 10 and 11 may be different from the embodiments described above in that the substrate of the display device has a flat plate shape, and other components may be substantially the same or similar, and thus detailed descriptions thereof will be omitted for ease in explanation of the embodiments.

Referring to FIGS. 6 and 10, a display element 100_1 may include a base member 110_1 and a first antenna unit 120, a second antenna unit 130, a third antenna unit 140, a driving circuit unit 150, and a pixel unit 160 disposed on the base member 110_1.

The base member 110_1 may include an upper surface 110a and a lower surface 110b parallel to the upper surface 110a, and may have a flat plate shape as a whole. FIG. 10 shows an embodiment in which the base member 110_1 has a rectangular structure on a plan, but the embodiments described herein are not limited thereto. In another embodiment, the base member 110_1 may be circular on a plan. In this case, the base member 110_1 may have a disk shape.

Various components of the display element 100_1 including the pixel unit 160 may be disposed on the upper surface 110a of the base member 110_1. According to an embodiment, the pixel unit 160 may be disposed on both the upper surface 110a and the lower surface 110b of the base member 110_1. In addition, at least one of the first antenna unit 120, the second antenna unit 130, the third antenna unit 140, and the driving circuit unit 150 of the display element 100_1 may be disposed on the lower surface 110b of the base member 110_1. In this case, the components disposed on the upper surface 110a and the lower surface 110b of the base member 110_1 may be connected to each other through a connection part penetrating the base member 110_1, but the present invention is not limited thereto.

In addition, at least a portion of the driving circuit unit 150 may be disposed under the pixel unit 160. In this case, since a space in which the pixel unit 160 is to be formed can be secured widely, display luminance of the display element 100_1 can be improved.

The first antenna unit 120, the second antenna unit 130, and the third antenna unit 140 disposed on the base member 110_1 may be respectively arranged in a coil shape in areas that do not overlap each other. Shapes of the first antenna unit 120, the second antenna unit 130, and the third antenna unit 140 are not limited thereto, and may have various other shapes. As shown in FIG. 11, the first antenna unit 120_2 may be disposed in the form of a coil wound to surround the outer portion of the base member 110_2.

As described above, when the display element 100_1 is formed in a plate shape, the display element 100_1 may be form in a small size having a width W100_1 (or size) of 1 µm to 500 µm. For example, the width W100_1 of the display element 100_1 may be 100 µm or less.

Figure 12:
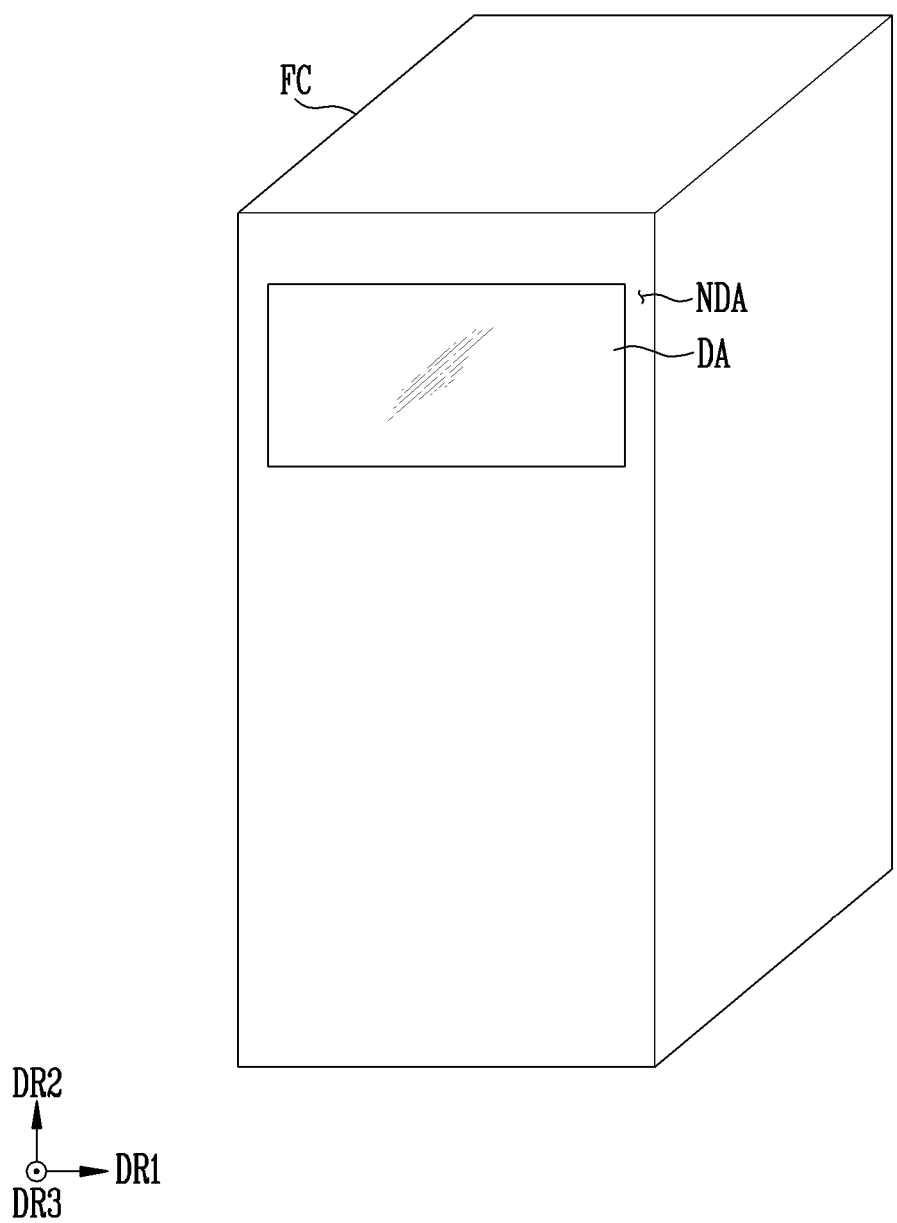
FIGS. 12, 13, and 14 are perspective views for explaining a method of manufacturing a display device according to an embodiment.
Figure 13:
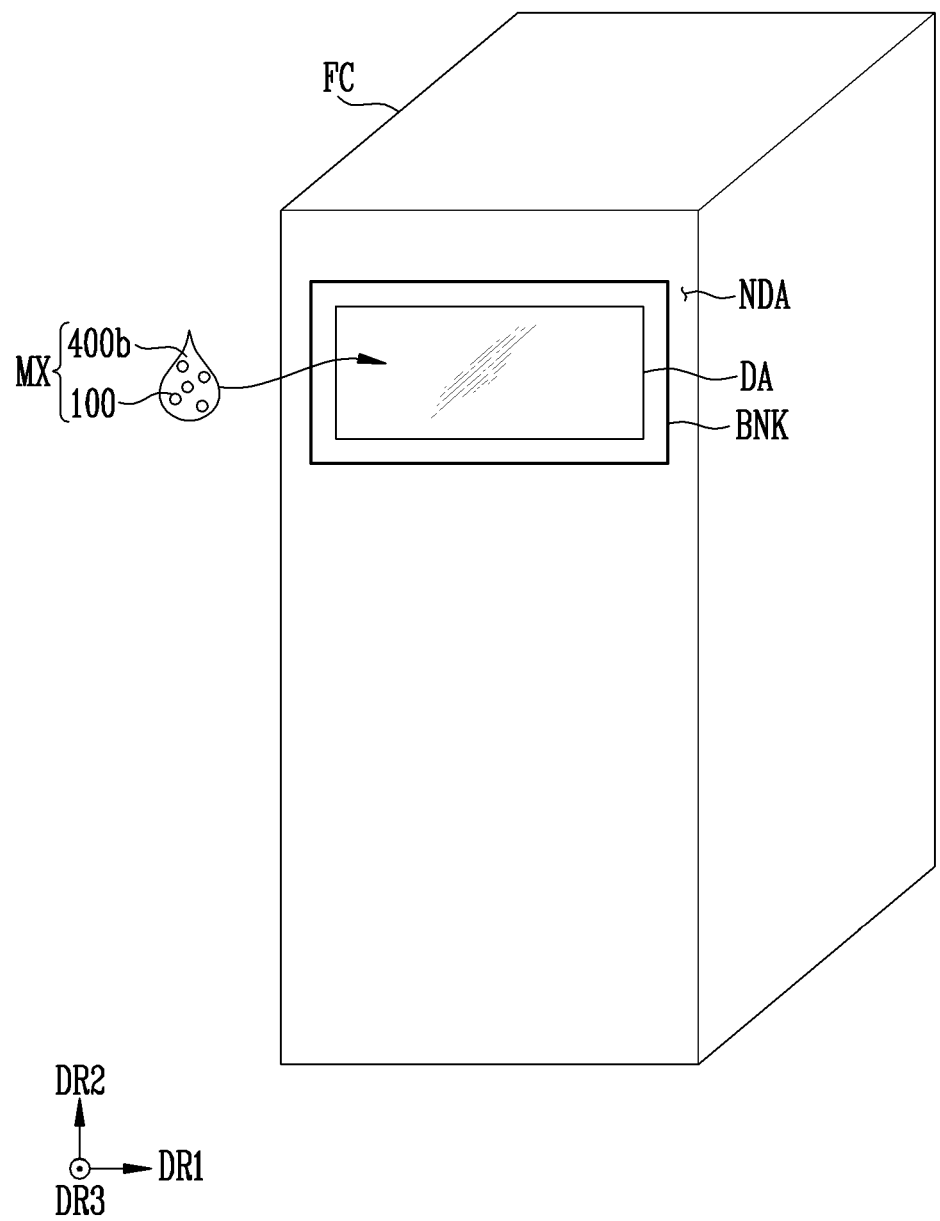
Figure 14:
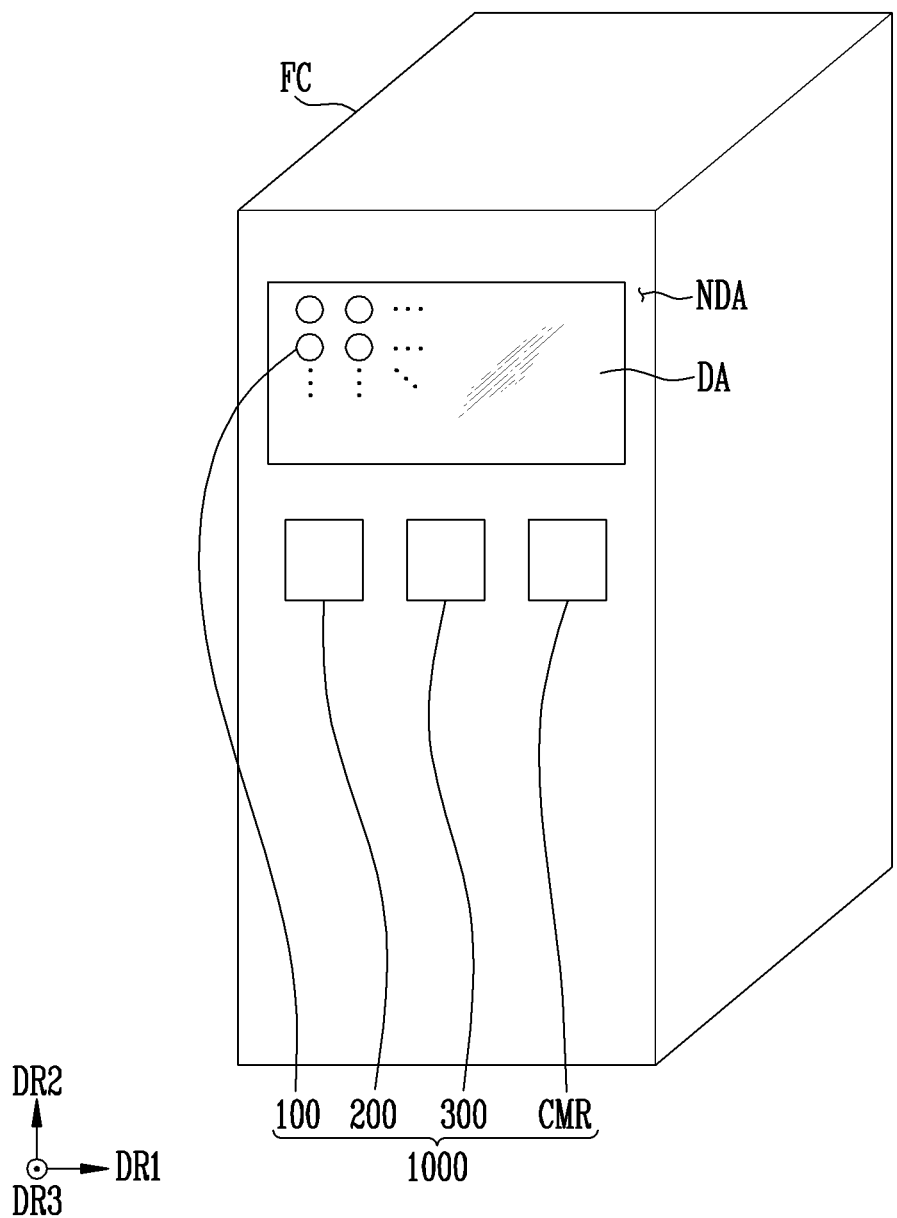

FIGS. 12 to 14 are perspective views for explaining a method of manufacturing a display device according to an embodiment. A method of manufacturing a display device to be described with reference to FIGS. 12 to 14 may be the method for manufacturing the display device described with reference to FIGS. 1A and 2, and the display device may include the display elements according to the embodiment of FIG. 6.

A method of manufacturing a display device according to an embodiment of the present invention will be schematically described with reference to the embodiment described with reference to FIGS. 1A and 2, and FIGS. 12 to 14.

First, as shown in FIG. 12, positions of the display area DA and the non-display area NDA surrounding the display area DA may be determined on one surface of the facility FC for implementing the display device 1000. In this case, one surface of the facility FC may include a curved surface in which the upper surface and the lower surface have curved surfaces. Also, the display area DA may be an area for displaying an image, and the non-display area NDA may be an area other than the display area DA.

In the embodiments described herein, the shape of the display area DA is not particularly limited. FIGS. 12 to 14 shows a flat plate structure having a rectangular parallelepiped shape in which the display area DA is a rectangle when viewed on a plan, but the display area DA may have various shapes such as various polygons such as a triangle and a pentagon, a circle, an oval, and the like, on a plan and the shape of the side surface thereof is also not limited.

Next, as shown in FIG. 13, a mixture MX may be formed by dispersing the plurality of display elements 100 in a fixing material 400b, and the mixture MX may be applied on one surface of the facility FC in the display area DA.

The display elements 100 may be uniformly dispersed in the fixing material 400b, and the concentration of the display elements 100 in the mixture MX may be uniform throughout. The concentration of the mixture MX may be adjusted according to the number of the display elements 100 dispersed in the fixing material 400b, and through this, the number of the display elements 100 disposed on one surface of the facility FC can be adjusted.

As described above, since each of the display elements 100 includes the encapsulation film 170 (refer to FIG. 6) disposed at the outermost portion, even if the display elements 100 are dispersed in the fixing material 400b, other components of the display elements 100 can be protected by the encapsulation film 170.

According to an embodiment, before applying the mixture MX on the display substrate, a bank BNK surrounding the display area DA may be further formed in the non-display area NDA.

The bank BNK may designate an area in which the mixture MX is applied so that the mixture MX can be stably applied within the display area DA of one surface of the facility FC. The bank BNK may be formed before applying the mixture MX, and may be removed after applying the mixture MX. However, according to an embodiment, the bank BNK may not be removed even after applying the mixture MX.

Next, as shown in FIG. 14, the display elements 100 may be disposed on the display area DA, and the signal controller 200 (refer to FIG. 1A) supplying the image signal, the power supply 300 (refer to FIG. 1A) supplying the power signal to the display elements 100, and the camera unit CMR (refer to FIG. 1A) capturing an object positioned in front of the display area DA may be formed.

The signal controller 200 may be disposed in the non-display area NDA included on one surface of the facility FC to wirelessly transmit the image signal to the display elements 100. The power supply 300 may be disposed in the non-display area NDA included on one surface of the facility FC to wirelessly transmit the power to the display elements 100. In addition, the camera unit CMR may be disposed in the non-display area NDA included on one surface of the facility FC to provide the captured image data to the signal controller 200. Positions of the signal controller 200, the power supply 300, and the camera unit CMR are not limited to those described above.

The position detection circuit 156 may generate the position information signal PIS of each display element 100 by using the communication between the plurality of display elements 100 applied on one surface of the facility FC. Specifically, positions of some of the display elements 100 (that is, the reference display element 100) among the display elements 100 applied on one surface of the facility FC may be recorded, and positions of the remaining display elements 100 included in the display area DA may be recorded based on the reference display elements 100 on which the positions are recorded.

For example, among the display elements 100 applied on one surface of the facility FC, the reference display element 100 may communicate with other display elements 100 using the third antenna unit 140 to receive the position signal SG3 of each display element 100. The third antenna unit 140 may provide the position information signal S3 to the position detection circuit 156. The communication between the display elements 100 may use phonon communication using a phonon or terahertz communication.

According to an embodiment, the position detection circuit 156 may determine (or address) the relative position between the plurality of display elements 100 disposed in the display area DA using Equation 1 described above.

According to the display device and the method of manufacturing the same according to the above-described embodiments, the display elements 100 having a small size that perform a display function alone by wirelessly receiving the power signal and the image signal can be formed, and the mixture MX in which the display elements 100 are mixed may be applied on one surface of the facility FC to manufacture the display device. That is, a large-sized display device can be easily manufactured without restriction of a space for manufacturing the display device. In addition, even when one surface of the facility FC has a complex shape such as a curved shape, the display device can be easily manufactured by applying the mixture MX including the display elements 100. Accordingly, manufacturing cost for manufacturing a large-sized display device or a display device having various shapes can be greatly reduced.

According to the smart display element and the display device including the same according to the embodiments of the present invention, an image can be displayed by addressing the display elements through mutual communication between the display elements directly disposed on a surface of the facility.

The effects according to the embodiments are not limited by the contents described above, and more various effects are included in the present specification.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:
1. A display device comprising:
   a first display layer including a plurality of display elements disposed on one surface of an object;
   a power supply which supplies a power signal to the display elements; and a signal controller which has an encoder that is configured to encode first image data into second image data and that is configured to supply the second image data to the display elements, wherein each of the display elements includes:
- a base member;
- a pixel disposed along a surface of the base member;
- a driving circuit unit which has a decoder that is configured to decode the second image data into the first image data and that is configured to provide a pixel driving signal based on the second image data to the pixel;
- a first antenna unit which receives the power signal wirelessly and provides the power signal to the driving circuit unit;
- is a second antenna unit which receives the second image data wirelessly and provides the second image data to the decoder; and
- a third antenna unit which transmits and receives an addressing signal for detecting a relative position between the display elements.

2. The display device of claim 1, wherein the encoder encodes the first image data into the second image data through a convolutional neural network (CNN).

3. The display device of claim 2, wherein the decoder is configured to decode the second image data into the first image data through the convolutional neural network (CNN).

4. The display device of claim 3, wherein the second image data includes position information of the display elements, meta information of an image, and grayscale value information of the image.

5. The display device of claim 4, wherein the meta information includes shape information of an object included in the image, segmentation information of the image, and setting information on which mode of a 2D mode, a 3D mode, and a hologram mode to display the image.

6. The display device of claim 5, wherein the decoder is configured to decode the second image data into the first image data using the shape information and the grayscale value information.

7. The display device of claim 3, wherein the decoder includes a central processing unit (CPU) and a graphics processing unit (GPU).

8. The display device of claim 1, wherein the driving circuit unit includes:
- a power storage circuit that is configured to store the power signal and outputs a first voltage signal; and
- a voltage control circuit that is configured to generate a second voltage signal and a third voltage signal based on the first voltage signal.

9. The display device of claim 8, wherein the driving circuit unit includes:
- a position detection circuit that is configured to transmit and receive the addressing signal between the display elements using the third antenna unit to generate a position information signal of a corresponding display element; and
- a memory circuit that is configured to receive the position information signal and outputs the position information signal.

10. The display device of claim 9, wherein the position information signal includes vector values including distance and direction information between the display elements.

11. The display device of claim 10, wherein the encoder adds position information generated based on position information signals of all of the display elements when encoding the first image data.

12. The display device of claim 9, wherein the driving circuit unit includes:
- a signal processing circuit that is configured to generate a pixel control signal based on the first image data, the second voltage signal, and the position information signal; and
- a pixel control circuit that is configured to provide the pixel driving signal to the pixel based on the pixel control signal and the third voltage signal.

13. The display device of claim 1, wherein the base member is made of a silicon substrate and has a spherical shape.

14. The display device of claim 13, wherein at least one of the first antenna unit, the second antenna unit, and the third antenna unit is disposed along the surface of the base member.

15. The display device of claim 14, wherein the third antenna unit uses phonon communication or terahertz communication.

16. The display device of claim 13, wherein the pixel includes:
- a first electrode layer disposed on the base member;
- a light emitting layer disposed on the first electrode layer; and
- a second electrode layer disposed on the light emitting layer,
- wherein at least one of the first electrode layer, the light emitting layer, and the second electrode layer is curved along the surface of the base member.

17. The display device of claim 16, wherein the light emitting layer includes an organic material or an inorganic material.

18. The display device of claim 1, wherein the display elements have a size of 1 um to 500 um.

19. The display device of claim 1, wherein the first display layer includes a fixing layer disposed on the display elements.

20. The display device of claim 19, further comprising:
- a second display layer disposed on the first display layer, wherein the second display layer includes the display elements.

* * * * *

UNITED STATES PATENT AND TRADEMARK OFFICE
CERTIFICATE OF CORRECTION

| | |
|---|---|
| PATENT NO. | : 11,716,477 B2 |
| APPLICATION NO. | : 17/685408 |
| DATED | : August 1, 2023 |
| INVENTOR(S) | : Takayuki Fukasawa |

It is certified that error appears in the above-identified patent and that said Letters Patent is hereby corrected as shown below:

In the Claims

"is" at the beginning of the 21st Line of Claim 1, Line 16 in Column 21, should be deleted.

Signed and Sealed this
Fifth Day of September, 2023

Katherine Kelly Vidal
*Director of the United States Patent and Trademark Office*